(12) United States Patent
Lee et al.

(10) Patent No.: US 9,475,905 B2
(45) Date of Patent: Oct. 25, 2016

(54) HIGH-MOLECULAR WEIGHT ALIPHATIC POLYCARBONATE PREPARED USING BASE CATALYST

(71) Applicant: LOTTE CHEMICAL CORPORATION, Seoul (KR)

(72) Inventors: Bun Yeoul Lee, Suwon-si (KR); Ji Hae Park, Hwaseong-si (KR); Jong Yeob Jeon, Chungcheongnam-do (KR); Jung Jae Lee, Suwon-si (KR); Young Eun Jang, Seoul (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 14/761,312

(22) PCT Filed: May 28, 2013

(86) PCT No.: PCT/KR2013/004641
§ 371 (c)(1),
(2) Date: Jul. 16, 2015

(87) PCT Pub. No.: WO2014/112697
PCT Pub. Date: Jul. 24, 2014

(65) Prior Publication Data
US 2015/0353678 A1 Dec. 10, 2015

(30) Foreign Application Priority Data

Jan. 18, 2013 (KR) ........................ 10-2013-0005886

(51) Int. Cl.
| | |
|---|---|
| C08G 63/02 | (2006.01) |
| C08G 64/02 | (2006.01) |
| C08G 64/30 | (2006.01) |
| C08K 5/098 | (2006.01) |
| C08K 5/16 | (2006.01) |
| C08K 5/50 | (2006.01) |

(52) U.S. Cl.
CPC ......... *C08G 64/0208* (2013.01); *C08G 64/305* (2013.01); *C08K 5/098* (2013.01); *C08K 5/16* (2013.01); *C08K 5/50* (2013.01)

(58) Field of Classification Search
CPC .................................................. C08G 61/02
USPC ...................................... 528/76, 80, 86, 370
See application file for complete search history.

(56) References Cited

U.S. PATENT DOCUMENTS

| | | | |
|---|---|---|---|
| 5,070,173 | A | 12/1991 | Yokota et al. |
| 5,171,830 | A | 12/1992 | Grey |
| 5,962,622 | A | 10/1999 | Darnell et al. |
| 2001/0047073 | A1 | 11/2001 | Mizia et al. |
| 2003/0204042 | A1 | 10/2003 | Moethrath et al. |
| 2004/0152861 | A1* | 8/2004 | Nefzger .................. C07C 41/09 528/76 |
| 2005/0131179 | A1 | 6/2005 | Cozens et al. |
| 2008/0319156 | A1 | 12/2008 | Fischer et al. |
| 2009/0117314 | A1 | 5/2009 | Haese et al. |
| 2010/0041856 | A1 | 2/2010 | Gross et al. |
| 2010/0292497 | A1 | 11/2010 | Masubuchi et al. |
| 2011/0034616 | A1 | 2/2011 | Noordover et al. |

FOREIGN PATENT DOCUMENTS

| | | |
|---|---|---|
| CN | 1161346 | 10/1997 |
| CN | 101643542 | 2/2010 |
| CN | 101643542 A | 2/2010 |
| CN | 1454915 | 11/2013 |
| EP | 0302712 A2 | 2/1989 |
| EP | 1134248 B1 | 8/2005 |
| EP | 1874846 B1 | 1/2008 |
| EP | 2036937 A1 | 3/2009 |
| JP | 2010-053165 A | 3/2010 |
| KR | 10-2003-0085495 A | 11/2003 |
| KR | 10-2006-0133987 A | 12/2006 |
| KR | 10-0853358 B1 | 8/2008 |
| KR | 10-2009-0047370 A | 5/2009 |
| KR | 10-2010-0016395 A | 2/2010 |

OTHER PUBLICATIONS

International Search Report for PCT/KR2013/004641 mailed Nov. 1, 2013 from Korean Intellectual Property Office.
A.P. Peôgo et al., "Enhanced mechanical properties of 1,3-trimethylene carbonate polymers and networks", Polymer 44 (2003) 6495-6504.
Yamamoto et al.,"High-Molecular-Weight Polycarbonates Synthesized by Enzymatic ROP of a Cyclic Carbonate as a Green Process", Macromol. Biosci. 2009, 9, 968-978.
Foy et al.,"Synthesis of Linear Aliphatic Polycarbonate Macroglycols Using Dimethylcarbonate", Journal of Applied Polymer Science, vol. 111, 217-227 (2009).
Feng et al.,"Environmentally Benign Route for the Synthesis of Polycarbonate Diols (PCDLs)-Calcined MgAl Hydrotalcites as Heterogeneous Catalysts Yue", Ind. Eng. Chem. Res.2008,47, 2140-2145.
Pokharkar et al.,"Poly(alkylene carbonate)s by the carbonate interchange reaction of aliphatic diols with dimethyl carbonate: synthesis and characterization", Polymer vol. 36, 4851-4854, 1995.
Naik et al.,"Organo-catalyzed synthesis of aliphatic polycarbonates in solvent-free conditions", Polym. Chem., 2012, 3,1475.

(Continued)

*Primary Examiner* — Terressa Boykin
(74) *Attorney, Agent, or Firm* — STIP Law Group, LLC (57) ABSTRACT

An aliphatic polycarbonate is disclosed in which a salt consisting of a metal or onium cation and an anion having a pKa not greater than 3 is dispersed. The aliphatic polycarbonate includes repeating units of Formula 1: [-A-OC(O)O-] (wherein A is a substituted or unsubstituted $C_3$-$C_{60}$ alkylene, or a substituted or unsubstituted $C_3$-$C_{60}$ heteroalkylene and the O-A-O units in one polymer chain may be identical to or different from each other).

14 Claims, 2 Drawing Sheets

(56) References Cited

OTHER PUBLICATIONS

Zhu et al.,"High-molecular-weight aliphatic polycarbonates by melt polycondensation of dimethyl carbonate and aliphatic diols: synthesis and characterization", Polym Int 2011; 60: 1060-1067.
Zhu et al.,"Synthesis, Characterization and Degradation of Novel Biodegradable Poly(butylene-co-hexamethylene carbonate) Copolycarbonates", Journal of Macromolecular Science, Part A: Pure and Applied Chemistry (2011) 48, 583-594.
Zhu et al.,"Thermal degradation mechanism of poly(butylene carbonate)", Polymer Degradation and Stability 97 (2012) 1589-1595.
Varghese et al.,"Thermal and weathering degradation of poly(propylene carbonate)", Polymer Degradation and Stability, 2010, 95(6),1039-1044.
First Office Action, State Intellectual Property Office of China, Apr. 27, 2016 (English Translation and Original Document).
Search Report, State Intellectual Property Office of China. (English Translation and Original Document).

* cited by examiner

HIGH-MOLECULAR WEIGHT ALIPHATIC POLYCARBONATE PREPARED USING BASE CATALYST

CROSS REFERENCE TO PRIOR APPLICATIONS

This application is a National Stage Application of PCT International Patent Application No. PCT/KR2013/004641 filed on May 28, 2013, under 35 U.S.C. §371, which claims priority to Korean Patent Application No. 10-2013-0005886 filed on Jan. 18, 2013, which are all hereby incorporated by reference in their entirety.

TECHNICAL FIELD

The present invention relates to a high molecular weight aliphatic polycarbonate prepared using a base catalyst and a method for preparing the same.

BACKGROUND ART

Aliphatic polycarbonates are biodegradable eco-friendly polymers. Poly(ethylene carbonate) and poly(propylene carbonate) as aliphatic polycarbonates can be prepared via alternating copolymerization of carbon dioxide as a monomer with the corresponding epoxide. The use of carbon dioxide is of great environmental value (Reaction 1). A catalyst with ultrahigh activity for carbon dioxide/epoxide copolymerization reaction was developed by the present inventors and is currently ready for commercialization under the trademark Green Pol (Korean Patent No. 10-0853358). The number of carbon atoms in the carbonate linking groups of aliphatic polycarbonates prepared via dioxide/epoxide copolymerization is limited to 2. Poly(ethylene carbonate) and poly(propylene carbonate) as representative aliphatic polycarbonates have limited physical properties, such as low glass transition temperatures of 40° C. and 20° C., respectively, and lack of crystallinity.

Aliphatic polycarbonates whose carbonate linkers each have three or more carbon atoms can be prepared via ring-opening polymerization of the corresponding cyclic compounds (Reaction 2). Such ring-opening polymerization has the advantages that no by-products are formed and final polymers have high molecular weights (e.g., weight average molecular weights of hundreds of thousands) (Pego A P, Grijpma D W and Feijen J, *Polymer* 2003, 44, 6495-6504); Yamamoto Y, Kaihara S, Toshima K and Matsumura S, *Macromol Biosci* 2009, 9, 968-978). However, the monomeric cyclic compounds are not easy to produce and their use is thus not suitable for the commercialization of aliphatic polycarbonates. That is, the trimethylene carbonate shown in Reaction 2 is currently sold at a price of about 158,000 won per 50 g by Aldrich and is thus unsuitable for use as a monomer for the preparation of general-purpose polymers. The (tetramethylene carbonate) dimer and (hexamethylene carbonate) dimer are not distributed in the market and are produced through complicated isolation and purification processes using enzymes. Accordingly, the use of the dimers is inappropriate for mass production of aliphatic polycarbonates on a commercial scale.

The most appropriate method for mass production of aliphatic polycarbonates whose carbonate linkers each has three or more carbon atoms is associated with the condensation of dimethyl carbonate or diethyl carbonate and various diols (Reaction 3). Dimethyl carbonate and diethyl carbonate are inexpensive compounds that have been produced from phosgene. Efforts have been made to develop processes for the production of dimethyl carbonate and diethyl carbonate using carbon monoxide or carbon dioxide instead of toxic phosgene. The use of environmentally friendly carbon dioxide is more advantageous. Dimethyl carbonate and diethyl carbonate produced by these processes are in practical use at present.

There are many reports in the literature on the preparation of aliphatic polycarbonates via the condensation reaction shown in Reaction 3. However, Reaction 3 for the preparation of aliphatic polycarbonates is slow and has a limitation in increasing the molecular weight of the final polymers. Due to difficulties in the preparation of high molecular weight polymers, oligomeric macrodiols whose molecular weight is several thousands and both ends are capped with —OH groups are currently produced and used for polyurethane production. It was reported that macrodiols having a molecular weight not higher than 2,000 can be produced by condensation of 1,4-butanediol, 1,5-pentanediol, and 1,6-hexanediol with dimethyl carbonate (DMC) using a calcium catalyst (*J. Appl. Polym. Sci.* 2009, 111, 217-227). However, the overall reaction time is as long as 36 hours. After the reaction, the low molecular weight macrodiols are dissolved in acetone and the solid catalyst component is filtered off. According to a recent report, macrodiols having a low molecular weight on the order of 1,000 can be produced through a condensation reaction between 1,6-hexanediol and DMC using calcined MgAl hydrotalcites as solid bases (*Ind. Eng. Chem. Res.* 2008, 47, 2140-2145). The low molecular weight polymers are obtained in the form of oils and the residual catalysts are removed by filtration. In this case as well, the reaction time is very long (≥12 hours). Other reports are also found in the literature on the synthesis of macrodiols with a molecular weight on the order of several thousands and the production of polyurethane using the macrodiols (U.S. Patent Publication No. 2010/0292497; EP 302712; EP 1874846). The synthesis of the macrodiols usually requires a long reaction time of at least 10 hours and the use of a strongly basic catalyst. When a sodium alkoxide is used as the catalyst, the resulting polymer is dissolved in an organic solvent after the reaction and washed with water to remove the catalyst. In contrast, when the catalyst is a titanium alkoxide, no process is described for removal of the catalyst.

Efforts have also been made to prepare high molecular weight aliphatic polycarbonates. Sivaram et al. reported the preparation of aliphatic polycarbonates having weight average molecular weights of 6,000 to 25,000 by condensation of DMC with various diols (e.g., 1,4-butanediol, 1,6-hexanediol, 1,8-octanediol, and 1,4-bis(hydroxymethyl)cyclohexane) using 1,3-diphenoxytetra-n-butyldistannoxane as a catalyst (Polymer 1995, 36, 4851-4854). The overall reaction time is 11 hours and the reaction temperature is raised to 220° C. The reaction is carried out via a two-step process to increase the molecular weight of the polymers. After step 1, each reaction product is dissolved in methylene chloride and washed with water to remove unreacted diol compound. That is, as a strategy to increase the molecular weights of the polymers, water-insoluble oligomers end-capped with methyl carbonate are subjected to a condensation reaction while removing DMC in step 2. However, no effort to remove the catalyst is found in the report. U.S. Pat. No. 5,171,830 discloses a process for the preparation of aliphatic polycarbonates including condensing DMC with various diols using a tertiary amine or alkylammonium salt as a catalyst. According to a representative example of this patent, 1,4-butanediol is reacted with excess DMC at 150° C. for 8 hours to prepare mono- or bis(methyl carbonate) esters of 1,4-butanediol and a condensation reaction of the mono- or bis(methyl carbonate) esters is induced while removing volatiles under vacuum or reduced pressure at an elevated temperature up to 200° C. to increase the molecular weight of the polymer. However, the molecular weights of the polymers prepared by this process are only on the order of 2,400 and the end groups of the polymers are capped with methyl carbonate. For removal of the catalyst, the polymers are dissolved in chloroform and dropped into an alcoholic solvent to obtain precipitates. According to a recent report, an attempt has been made to synthesize aliphatic polycarbonates by condensation of various diols and DMC using 1-n-butyl-3-methylimidazolium-2-carboxylate (1 mol %) as a catalyst. However, the aliphatic polycarbonates have number average molecular weights not higher than 6,700 and their end groups are capped with methyl carbonate. For removal of the catalyst, the polymers are dissolved in THF and dropped into an alcoholic solvent to obtain precipitates (Polym. Chem. 2012, 3, 1475). Recently, Chuncheng Li et al. reported the preparation of a high weight average molecular weight aliphatic polycarbonate by condensation of DMC and 1,4-butanediol using a TiO$_2$/SiO$_2$/poly(vinyl pyrrolidone) mixture as a solid catalyst (Polym. Int. 2011, 60, 1060-1067; Journal of Macromolecular Science, Part A: Pure and Applied Chemistry 2011, 48, 583-594). The overall reaction time is about 10 hours. They took a strategy to increase the molecular weights of the polymer by preparing an oligomer end-capped with methyl carbonate in step 1 and inducing a condensation reaction of the oligomer while removing DMC in step 2. The creation of vacuum or reduced pressure at a high temperature of 200° C. is required to increase the molecular weight of the polymer. However, under these temperature and pressure conditions, a small amount of tetrahydrofuran (THF) is formed as a by-product. A thermally stable resin is obtained by dissolving the polymer in chloroform and precipitating the polymer in methanol (Polymer Degradation and Stability 2012, 97, 1589-1599).

DETAILED DESCRIPTION OF THE INVENTION

Problems to be Solved by the Invention

The present invention provides a high molecular weight aliphatic polycarbonate with improved thermal stability that is prepared using a base catalyst. The present invention also provides a method for preparing the aliphatic polycarbonate.

Means for Solving the Problems

According to one aspect of the present invention, there is provided an aliphatic polycarbonate in which a salt consisting of a metal or onium cation and an anion having a pKa not greater than 3 is dispersed, the aliphatic polycarbonate including repeating units of Formula 1:

[Formula 1]

wherein A is a substituted or unsubstituted $C_3$-$C_{60}$ alkylene, or a substituted or unsubstituted $C_3$-$C_{60}$ heteroalkylene and the O-A-O units in one polymer chain may be identical to or different from each other.

The term "alkyl" used herein is intended to include straight chained, branched, and cyclic hydrocarbon radicals. The term "alkylene" refers to a divalent radical derived from alkyl. For example, the alkylene includes methylene, ethylene, isobutylene, cyclohexylene, cyclopentylethylene, 2-prophenylene, and 3-butynylene. The term "heteroalkyl", by itself or in combination with another term, means, unless otherwise stated, a stable straight or branched chain, or cyclic hydrocarbon radical, or combinations thereof, consisting of one or more carbon atoms and one or more heteroatoms selected from the group consisting of O, N, P, Si, and S, and wherein the nitrogen, phosphorus, and sulfur atoms may optionally be oxidized and the nitrogen heteroatom may optionally be quaternized. Similarly, the term "heteroalkylene" refers to a divalent radical derived from heteroalkyl.

The term "substituted" in the expression of "substituted or unsubstituted" described herein means that one or more hydrogen atoms in the hydrocarbon are each independently replaced by the same or different substituents.

Suitable substituents include, but are not limited to, —R$^a$, -halo, —O$^-$, =O, —OR$^b$, —SR$^b$, —S$^-$, =S, —NR$^c$R$^c$, =NR$^b$, =N—OR$^b$, trihalomethyl, —CF$_3$, —CN, —OCN, —SCN, —NO, —NO$_2$, =N$_2$, —N$_3$, —S(O)$_2$R$^b$, —S(O)$_2$NR$^b$, —S(O)$_2$O$^-$, —S(O)$_2$OR$^b$, —OS(O)$_2$R$^b$, —OS(O)$_2$O$^-$, —OS(O)$_2$OR$^b$, —P(O)(O$^-$)$_2$, —P(O)(OR$^b$)(O$^-$), —P(O)(OR$^b$)(OR$^b$), —C(O)R$^b$, —C(S)R$^b$, —C(NR$^b$)R$^b$, —C(O)O$^-$, —C(O)OR$^b$, —C(S)OR$^b$, —C(O)NR$^c$R$^c$, —C(NR$^b$)

$NR^cR^c$, $-OC(O)R^b$, $-OC(S)R^b$, $-OC(O)O^-$, $-OC(O)OR^b$, $-OC(S)OR^b$, $-NR^bC(O)R^b$, $-NR^bC(S)R^b$, $-NR^bC(O)O^-$, $-NR^bC(O)OR^b$, $-NR^bC(S)OR^b$, $-NR^bC(O)NR^cR^c$, $-NR^bC(NR^b)R^b$, and $-NR^bC(NR^b)NR^cR^c$, where $R^a$ is selected from the group consisting of alkyl, cycloalkyl, heteroalkyl, cycloheteroalkyl, aryl, arylalkyl, heteroaryl, and heteroarylalkyl groups; each $R^b$ is independently hydrogen or $R^a$; each $R^c$ is independently $R^b$, with the proviso that the two $R^c$ groups, together with the nitrogen atom to which they are attached, may form a 4-, 5-, 6- or 7-membered cycloheteroalkyl and may optionally include 1 to 4 identical or different additional heteroatoms selected from the group consisting of O, N, and S. As a specific example, $-NR^cR^c$ is meant to include $-NH_2$, —NH-alkyl, N-pyrrolidinyl, and N-morpholinyl. As another example, the substituted alkyl is meant to include -alkylene-O-alkyl, -alkylene-heteroaryl, -alkylene-cycloheteroalkyl, -alkylene-C(O)OR$^b$, -alkylene-C(O)NR$^b$R$^b$, and $-CH_2-CH_2-C(O)-CH_3$. The one or more substituents, together with the atoms to which they are attached, may optionally form cyclic rings including cycloalkyl and cycloheteroalkyl.

The metal cation is intended to include alkali metal cations, alkaline earth metal cations, aluminum cation, zinc cation, and other metal cations. The onium cation includes those defined by IUPAC in a broad sense and representative examples thereof are tetraalkylammonium, imidazolium, and tetraalkyl(or aryl)phosphonium cations.

The aliphatic polycarbonate of the present invention is prepared using a base catalyst consisting of a metal or onium cation. A metal cation or an onium cation as a catalytic component may be included in a final polymer because general condensation catalysts are not easy to be separated and removed from the final polymer after use. Generally, when a catalytic component of a base catalyst remains unremoved after a condensation reaction, a final resin loses its thermal stability. Accordingly, the catalyst is removed by dissolving the condensation product in a water-immiscible solvent, such as methylene chloride, and washing the solution with water or dissolving the condensation product in an organic solvent and dropping the solution in an alcoholic solvent to precipitate the polymer, as described in the Background Art. The present inventors were aware that when the high molecular weight aliphatic polycarbonate of the present invention is dissolved in methylene chloride and washed with water, the water is suspended or dispersed in the form of an emulsion in the methylene chloride layer, making it difficult to remove the base catalyst by washing. Further, this washing incurs an additional cost, which creates an economic burden when it is intended to prepare the aliphatic polycarbonate on a large scale. Therefore, it would be desirable to use a resin including the catalyst component without removal after condensation.

The catalyst added in the initial stage of the reaction is a salt consisting of a metal or onium cation and an alkoxy anion formed by deprotonation of HO-A-OH and is dissolved/dispersed in the diol compound as an initial reaction medium, which will be described in the preparation method and the Examples section that follow. The polymer chain grows from the alkoxy anion of the diol during condensation in steps 1 and 2, and as a result, the catalytic component becomes a terminal alkoxy anion of the polymer. The aliphatic polycarbonate of the present invention is prepared by condensation using a solution of the alkoxy base catalyst in the polar diol monomer. The aliphatic polycarbonate has the alkoxy anion at its terminal position. As a consequence, the metal or onium cation is dispersed in the polymer medium.

The terminal alkoxy anion of the aliphatic polycarbonate is highly reactive. When the resin is used in a state which the anion is dispersed, its poor thermal stability may cause a problem during processing or in terms of durability (see Comparative Example 3 and FIG. 2). Poor thermal stability of resins caused by unremoved catalytic components is a major issue in the preparation of polypropylene carbonate) on a commercial scale (*Polymer Degradation and Stability* 2010, 95(6), 1039-1044). Also Chencheng Li conducted research on the thermal stability of poly(1,4-butylene carbonate) after the polymer was dissolved in chloroform and precipitated in methanol to completely remove a catalytic component (*Polymer Degradation and Stability* 2012, 97, 1589-1595). Chencheng Li confirmed through his research that the unremoved catalyst deteriorates the thermal stability of a resin (Comparative Example 4). As a solution to the problem of poor thermal stability caused by the alkoxy anion, the present invention proposes a neutralization reaction in step 3, which will be described below. In the final aliphatic polycarbonate, a salt consisting of a metal or onium cation and an anion having a pKa not greater than 3 is dispersed.

In the product including the terminal alkoxy anion obtained after steps 1 and 2, the alkoxy anion is dispersed in the highly viscous polymer medium. Accordingly, the salt formed by a neutralization reaction in step 3 is also dispersed in the polymer. The term "dispersed" used herein means that the catalytic component is substantially distributed throughout the aliphatic polycarbonate matrix without being separated at a macroscopic level. The aliphatic polycarbonate has low polarity and the salt consisting of a metal or onium cation as the catalytic component has high polarity. Due to their different polarities, the catalytic component of the salt is not readily dispersed in the polymer by general mixing methods. Accordingly, the aliphatic polycarbonate in which the salt is dispersed is a characteristic mixture obtainable by the method of the present invention, which will be described below.

Since the condensation reaction between DMC and a diol is typically slow, the addition of a large amount of a catalyst is required to increase the reaction rate. EP0302712B1 describes the preparation of a low molecular weight macrodiol by reacting DMC with a diol using a sodium alkoxide as a base catalyst for a total of 10 hours, which is described in the Background Art. The base catalyst is used in an amount of 1 mol %, based on the moles of the diol. To avoid the problems caused by the considerable amount of the catalyst, the product is dissolved in methylene chloride and washed with a dilute aqueous acid solution to neutralize the catalyst.

In contrast, according to the method of the present invention, the high molecular weight aliphatic polycarbonate can be prepared using a small amount of the base catalyst. Particularly, since the catalyst is used in an amount of 0.01 mol % to 0.5 mol %, based on the moles of a diol monomer, the amount of the salt dispersed in the polymer is insignificant. In addition, the insignificant amount of the salt is uniformly dispersed throughout the resin and its influence on the macroscopic physical properties of the resin is thus negligible. The method of the present invention enables the preparation of the high molecular weight aliphatic polycarbonate despite the use of the base catalyst in an amount as small as 0.01 mol % to 0.5 mol %, which is distinguished from methods known in the art.

Water as an impurity is removed from the diol monomer before use. This greatly enhances the reaction rate, thus enabling the preparation of the high molecular weight aliphatic polycarbonate despite the use of a small amount of the base catalyst for a short reaction time (see Comparative Example 3). General diols are likely to contain water as an impurity to some extent due to their high affinity for water. Diols tend to absorb water present in air. Due to this tendency, the amount of impurity in diols varies depending on what extent the diols are exposed to air. The present inventors have found that the use of the water-free diol considerably improves the reaction rate and makes the reaction reproducible. There is no restriction on the upper limit of the number of moles of the catalyst added. However, the addition of the catalyst in an amount exceeding 0.5 mol % is economically undesirable and may have an adverse effect on increasing the molecular weight of the polymer (see Example 7 in Table 1). If the catalyst is added in an amount exceeding 0.5 mol %, the alkoxy anion is incompletely dissolved to give a precipitate as the reaction proceeds, making the polymer opaque and cloudy. Meanwhile, if the catalyst is added in an amount of less than 0.01 mol %, the reaction rate is so low that it is not easy to prepare a high molecular weight polymer. For these reasons, the amount of the catalyst is preferably adjusted to 0.01 mol % to 0.5 mol %. Since a large portion of the HO-A-OH added is incorporated into the polymer chain and the catalyst remains unremoved, the molar ratio of the dispersed salt to the repeating units can be maintained close to that of the salt to the diol originally added.

The terminal alkoxy anion of the polymer chain formed through steps 1 and 2, which will be described below, can be converted to an anion having a pKa not greater than 3 by a neutralization reaction with an appropriate compound in step 3, which will also be described below. The anion having a pKa not greater than 3 is insignificantly reactive, ensuring good thermal stability of a final resin. For reference, when the alkoxy anion has a pKa of about 15 and remains dispersed in a resin, the thermal stability of the resin is deteriorated (Comparative Example 4). Even when the alkoxy anion is converted to a carboxylate anion after neutralization with a carboxylic acid, the thermal stability of the resin is deteriorated, which was empirically confirmed in Comparative Example 5. The pKa of the carboxylate anion is typically at a level of 4 to 5. In view of the foregoing, it is preferred that the anion formed after the neutralization reaction has a pKa not greater than 3. Anions having a pKa not greater than 3 formed by reaction with the alkoxy anion are shown in Example 13.

Numerous anions having a pKa of 3 or less are known. Particularly preferred are anions selected from the group consisting of halide, phosphate, alkyl phosphate, aryl phosphate, dialkyl phosphate, diaryl phosphate, alkyl phosphonate, aryl phosphonate, dialkyl phosphinate, and diaryl phosphinate anions that are easily formed by neutralization reactions with alkoxy anions (see Example 13). When the base catalyst consists of a lithium, sodium or potassium cation and an alkoxy anion is used, the high molecular weight polymer is obtained in high yield. These metal bases are preferably available at reasonable prices (see Examples 1 to 10 and 12 in Table 1).

The HO-A-OH as a raw material for the aliphatic polycarbonate of Formula 1 is selected from the group consisting of the compounds of Formulae 2a to 2h:

[Formula 2a]

These compounds are suitable in terms of availability because they are currently produced on a large scale.

Particularly, the use of the diol compounds of Formulae 2a to 2d as monomers enables the preparation of polymers with very high weight average molecular weights of 80,000 to 250,000, which was confirmed in Examples 1 to 11 in Table 1 and Examples 35 and 36 in Table 3.

Particularly, 1,4-butanediol of Formula 2a is produced on the largest scale at low cost and can be used to prepare biodegradable poly(butylene carbonate), which are responsible for its high availability. Poly(butylene carbonate) is a crystalline polymer having a $T_m$ of 62° C. Various grades of poly(butylene carbonate) are possible by diversifying the $T_m$, degree of crystallization, and rate of crystallization of the polymer. This helps market exploitation of the polymer. In this aspect, useful is an aliphatic poly(alkylene carbonate) copolymer prepared from a mixture of 1,4-butanediol of Formula 2a and one diol selected from the group consisting of the compounds of Formulae 2b to 2h. Particularly, when excess 1,4-butanediol and a small amount of one diol selected from the group consisting of the compounds of Formulae 2b to 2h are used, for example, in a molar ratio of 100:1-10, an economically desirable aliphatic poly(alkylene carbonate) copolymer can be prepared. For example, a polymer with a very high weight average molecular weight of 80,000 to 250,000 may be prepared using as a mixture of 1,4-butanediol of Formula 2a and one diol selected from the group consisting of the compounds of Formulae 2b to 2h, which can be confirmed in Table 2.

As described in the Background Art, there is a limitation in increasing the molecular weight of conventional aliphatic polycarbonates. That is, little is known about the preparation of aliphatic polycarbonates with a weight average molecular weight of 80,000 or more by condensation of diols and dialkyl carbonates. Sivaram et al. reported that the number average molecular weight of an aliphatic polycarbonate prepared by condensation of 1,6-hexanediol and DMC using 1,3-diphenoxytetra-n-butyldistannoxane as a tin catalyst reached a maximum of 9,550 (*Polymer Vol.* 36 1995, 4851-4854), which are also described in the Background Art. In recent years, Chuncheng Li et al. have reported the preparation of a polymer with a maximum weight average molecular weight of 170,000 by condensation of DMC and 1,4-butanediol using a complex $TiO_2/SiO_2$/poly(vinyl pyrrolidone) mixture as a solid catalyst (*Polym Int* 2011, 60, 1060-1067). However, since the catalyst is very different from the base catalyst used in the present invention consisting of a metal or onium cation, the polymer is irrelevant to the aliphatic polycarbonate of the present invention in which a salt consisting of a metal or onium cation is dispersed. The present inventors failed to reproduce the experiment conducted by Chuncheng Li et al. Chuncheng Li et at reported in Chinese Patent No. 101643542 that a polymer with a number average molecular weight of 55,400 can be prepared by condensation of 1,4-butanediol and DMC, which was referred to in their paper reporting the preparation of the polymer with a molecular weight of 170,000. They used two kinds of catalysts $K_2CO_3$ and $LiCO_3$. The amount of $LiCO_3$ (0.67 mol %) used is larger than that of the catalyst used in the present invention. The reaction is carried out at a temperature of 240° C., which is much higher than that (190° C.) in the present invention. That is, according to the present invention, a smaller amount of the catalyst is used and a lower reaction temperature is applied to obtain a number average molecular weight higher than 55,400 (Table 1). Particularly, the resin prepared by Li et al. includes an alkoxide or carbonate anion because it does not undergo neutralization after condensation. The pKa values of the alkoxy and carbonate anions are greater than 3, which is outside the pKa range defined in the present invention.

The present inventors have succeeded in developing a two-step process for preparing a high molecular weight aliphatic polycarbonate in an effective manner. According to this method, in step 1, a mixture of HO-A-OH and dimethyl carbonate is heated to or above the boiling point of the dimethyl carbonate in the presence of a base catalyst. The HO-A-OH is preferably anhydrous. The anhydrous HO-A-OH means that the HO-A-OH is substantially free of water, for example, the HO-A-OH contains ≤100 ppm of water. The condensation reaction is allowed to proceed while removing an alcohol by-product. In the subsequent step 2, the reaction product of step 1 is allowed to react while distilling off volatiles under reduced pressure at high temperature to maximize the conversion rate of the reaction.

For a maximum conversion rate of the reaction, the molar ratio of the methoxy groups to the hydroxyl groups in the reaction product of step 1 is controlled to the range of 1:0.9-1.5, which is the greatest feature of the present invention. When the molar ratio of the hydroxyl groups to the methoxy groups is maintained close to 1:1 in the reaction of step 2, the final polymer has a high weight average molecular weight. Herein, A is a substituted or unsubstituted $C_3$-$C_{60}$ alkylene, or a substituted or unsubstituted $C_3$-$C_{60}$ heteroalkylene, the base catalyst is a salt consisting of a metal or onium cation and an alkoxy anion formed by deprotonation of the HO-A-OH, and the final condensation product has repeating units of —[OC(O)O-A]-. The O-A-O units in one polymer chain may be identical to or different from each other. In the final condensation product, a salt consisting of a metal or onium cation and an alkoxy anion formed by deprotonation of the terminal hydroxyl group of the aliphatic polycarbonate is dispersed.

The base catalyst is a salt compound consisting of a metal or onium cation and an alkoxy anion formed by deprotonation of the HO-A-OH. The salt compound can be easily prepared by adding a base, i.e. a hydroxyl, alkoxy, amide, hydride, alkyl or aryl compound of the metal or onium cation, to the HO-A-OH (see Table 1).

The molecular weight of the condensation product of the aliphatic diol and DMC can be increased by Reaction 1a in which methanol is formed as a by-product, Reaction 1b in which DMC is formed, and Reaction 1c in which a diol is formed.

The three reactions all are reversible and the molecular weight of the condensation product increases when the by-products are removed. Methanol and DMC are easy to remove due to their low boiling points (65° C. and 90° C., respectively) and the molecular weight of the condensation product can be increased through Reactions 1a and 1b. When the diol with a low molecular weight is removed under vacuum or reduced pressure, the molecular weight of the condensation product can be increased through Reaction 1c.

The molecular weight of the condensation product is determined by the degree of polymerization (DP) thereof. The DP of the condensation product is given by Carothers equation: $DP=(1+r)/(1-r-2rp)$ (where r is the ratio of the two functional groups reacting with each other and p is the conversion rate). A higher degree of polymerization is obtained when the conversion rate is maximized and the molar ratio of the two functional groups approaches 1:1. That is, when both r and p are very close to 1, a greater DP value is obtained, indicating a higher molecular weight of the final polymer. A high conversion rate can be accomplished when the reaction time or temperature increases. However, it is not easy to control the molar ratio of the two functional groups to 1:1. This often serves as a factor limiting the preparation of a higher molecular weight polymer by a condensation reaction. In the equation, when r is 0.98 slightly smaller than 1, DP is limited to 99, which is not a very large value, although the conversion rate is 100%. Even when precisely controlled amounts of the two monomers are added, the monomers may be partially decomposed during the reaction, may be stuck to the reactor wall, thus failing to participate in the reaction, or their purities may be slightly lowered. In this case, r may be distant from 1. For this reason, instead of preparing polyethylene terephthalate (PET) by condensation of equimolar amounts of terephthalic acid and ethylene glycol, PET with a higher molecular weight is prepared through two steps, as depicted in Reaction Scheme 2:

[Reaction 2]

Specifically, excess ethylene glycol is allowed to react with terephthalic acid to obtain an oligomer whose both end groups are capped with alcohol groups (step 1) and condensing the oligomer while removing ethylene glycol by distillation under reduced pressure at high temperature to increase the molecular weight of the final polymer (step 2).

A similar strategy was also taken in an attempt to prepare a high molecular weight aliphatic polycarbonate. Specifically, first, a diol is allowed to react with excess DMC to prepare an oligomer whose both end groups are capped with methyl carbonate groups and condensing the oligomer while removing DMC formed by Reaction 1b, achieving increased molecular weight of the final polymer. An advantage of this strategy is that the DMC is easy to remove due to its low boiling point (90° C.). Sivaram et al. separated the oligomer end-capped with methyl carbonate groups after step 1, followed by the subsequent reaction of the oligomer (*Polymer Vol.* 36 1995, pp. 4851-4854). In U.S. Pat. No. 5,962, 622, a strategy was took to convert a diol to bis(methyl carbonate) and isolate and purify the bis(methyl carbonate) to increase the molecular weight of a final polymer through Reaction 1b. U.S. Pat. No. 5,171,830 also attempted to prepare mono- or bis-(methyl carbonate) of 1,4-butanediol, followed by condensation in step 2 to increase the molecular weight of a final polymer. Chuncheng Li et al. states in their paper that they took a strategy to increase the molecular weight of a final polymer through Reaction 1b. Most attempts based on this strategy failed to prepare aliphatic polycarbonates having a weight average molecular weight of 50,000 or more. Chuncheng Li et al. reported successful preparation of a polymer having a weight average molecular weight of 170,000. However, they used a complex catalyst system composed of $SiO_2/TiO_2$/polypyrrolidone, unlike the present invention, and carried out a reaction at a high temperature of 200° C., resulting in the formation of by-products, such as THF (see the Background Art). On the other hand, the present inventors prepared the catalyst used in the experiment conducted by Chuncheng Li et al. and conducted the experiment under the same conditions, but failed to reproduce their results.

The present inventors were aware that when the reaction proceeds to a considerable extent, the —OH groups disappear, only a portion of the —OCH$_3$ groups remain unreacted, and as a result, the rate of Reaction 1b is very low in the presence of a base catalyst, making it difficult to increase the molecular weight of a final polymer to 60,000 or more (see Comparative Example 2). Thus, the present inventors took the strategy described above, which is distinguished from conventional methods for the preparation of high molecular weight aliphatic polycarbonates.

According to the method of the present invention, the condensation reaction is allowed to proceed using a base catalyst while removing methanol formed through Reaction 1a by distillation at ambient pressure (step 1). In this step, the methanol forms an azeotropic mixture with DMC, and as a result, the DMC together with a portion of the methanol is distilled off. The amount of the DMC removed together with the methanol is affected by the reactor, such as the height of a distillation column, and the reaction conditions, such as reaction temperature. Thus, it is impossible to accurately adjust the molar ratio between the two functional groups resulting from the molar ratio between the HO-A-OH and DMC added in the initial stage of the reaction, making it difficult to obtain a high molecular weight of the aliphatic polycarbonate using DMC. In contrast, in the case where an aromatic polycarbonate is prepared using DPC, such problems are not encountered because of the high boiling point of DPC, and as a result, the molar ratio between the two functional groups can be controlled by the addition of DPC and an aryldiol in the initial stage of the reaction, making it easy to obtain a high molecular weight of the polymer after condensation.

The present invention features that the HO-A-OH and DMC are subjected to a condensation reaction under heating at 90° C. or more at ambient pressure in the presence of a base catalyst while distilling off by-produced methanol and a portion of the DMC, to obtain a mixture in which the —OH functional groups and the —OCH$_3$ functional groups are in a molar ratio of 1:0.9-1.5 (step 1), and the mixture is heated under reduced pressure (step 2). The reaction rate of the DMC and the diol in the presence of a base catalyst is very slow at a low temperature. Although a higher temperature is more advantageous for the reaction, it is not easy to raise the initial reaction temperature to 90° C. or more because the boiling point of DMC is 90° C. It is preferred that the reactants are heated to reflux at 90° C. in the initial stage of the reaction while removing resulting methanol by fractional distillation. As the reaction proceeds, the boiling temperature of the solution increases gradually, which leads to an increase in reaction rate.

After step 1, the reaction solution is sampled to measure the molar ratio between the —OH and —OCH$_3$ functional groups. That is, before the reaction solution is heated under reduced pressure in step 2, a portion of the DMC remaining unreacted and the methanol by-product are removed from the sample of the reaction solution under reduced pressure at high temperature, and thereafter, the molar ratio can be determined by $^1$H NMR spectroscopy. The molar ratio between the —OH and —OCH$_3$ functional group can be empirically adjusted to 1:0.9-1.5 by varying the reaction time and the initial molar ratio of the DMC/HO-A-OH depending on the conditions of the reactor, the kind and amount of the base catalyst, and the amount of the diol added. For example, the molar ratio between the DMC and HO-A-OH can be adjusted to 1:0.9-1.5 by the following procedure. First, the DMC and HO-A-OH in a molar ratio of 2.0:1 are added to a reactor and a predetermined amount of the catalyst is added thereto. The reactor is immersed in an oil bath at 120° C. After the reaction is carried out for 1 hour, methanol as a by-product and unreacted DMC are removed. The molar ratio between the —OH and —OCH$_3$ functional groups in the remaining mixture is analyzed by NMR. If the molar ratio is observed to be 1:>1.5, the reaction time is shortened or the initial molar ratio of the DMC/HO-A-OH is adjusted to a lower value. The above procedure is repeated until the molar ratio reaches 1:≤1.5, finally 1:0.9-1.5. These empirically determined conditions can be continuously applied to the reactor.

Another important feature of the present invention is to remove water as an impurity present in the diol before use. This water removal considerably increases the reaction rate of step 1, and as a result, the molar ratio between the —OH and —OCH$_3$ functional groups can be adjusted to fall within the range of 1:0.9-1.5 in a short time of 1 hour by the use of a small amount of the DMC. When step 1 is carried out under the same conditions except that the diol containing water as an impurity is used without purification, the [OCH$_3$]/[OH] ratio is 0.46, which is much lower than 1, and the conversion of the alcohol groups to the carbonate groups is 54%, which is much lower than that (79%) obtained when the anhydrous diol is used. These results can be found in Comparative Example 1. When 1,4-butanediol is used without purification, the [OCH$_3$]/[OH] ratio and the conversion of the alcohol groups to the carbonate groups may vary depending on the water content of the 1,4-butanediol, causing inconvenience that the already set reaction conditions cannot be applied any more. General diols are likely to contain water as an impurity to some extent due to their high affinity for water. Diols tend to absorb water present in air. Due to this tendency, the amount of impurity in diols varies depending on what extent the diols are exposed to air. The present inventors have found that the use of the water-free diol considerably improves the reaction rate and makes the reaction reproducible. Generally, it is not easy to predict that water may greatly affect a reaction in which a protic polar compound, such as a diol, serves as both a solvent and a reactant.

After the molar ratio between the —OH and —OCH$_3$ functional groups is set to be close to 1:1 through the reaction in step 1, a condensation reaction of the reaction mixture is allowed to proceed under heat and reduced pressure in step 2 via Reaction 1a rather than via Reactions 1b and 1c. As a result, r in Carothers equation can be fixed at 1. At this time, when the conversion rate is increased sufficiently, a sufficiently high DP of the polymer can be achieved. In the early stage of step 2, the pressure and temperature of the reactor are maintained at relatively low levels. Under these conditions, the diol compound remains unremoved in the reaction system so that Reaction 1c can be avoided. Nevertheless, Reaction 1b cannot be avoided in a state in which considerable amounts of methoxy and alcohol groups are present in the early stage of step 2. That is, DMC, together with methanol, is removed due to its low boiling point (90° C.), resulting in a reduction in the number of methoxy groups. For this reason, it is preferred that the molar ratio between the —OH and —OCH$_3$ functional groups is set to a value slightly greater than 1:1 in step 1.

For a maximum conversion rate of the reaction, it is advantageous that the temperature is maintained as high as possible under high vacuum in the late stage of step 2. The present inventors were aware that the rates of Reactions 1b and 1c are much slower than the rate of Reaction 1a in the final step (Comparative Examples 2 and 3). When both —OH and —OCH$_3$ functional groups remain in the late stage of step 2, the conversion rate of the reaction can be increased by Reaction 1a, resulting in an increase in molecular weight. In contrast, if the molar ratio between the —OH and —OCH$_3$ functional groups is set to 1:<0.9 in step 1, only —OH functional groups remain and the —OCH$_3$ functional groups are exhausted in step 2. In this case, however, it is difficult to effectively increase the molecular weight of the final polymer, which is explained by the lower rate of Reaction 1c than that of Reaction 1a (see Example 3). If the molar ratio between the —OH and —OCH$_3$ functional groups is set to 1:>1.5 in step 1, only —OH functional groups are exhausted and the —OCH$_3$ functional groups remain in step 2. Also in this case, it is difficult to effectively increase the molecular weight of the final polymer, which is explained by the lower rate of Reaction 1b than that of Reaction 1a (see Comparative Example 2). That is, the feature of the present invention in which the [OCH$_3$]/[OH] ratio is adjusted to be close to 1:1 in the reaction of step 1, followed by a condensation reaction in step 2, is very effective in preparing a high molecular weight aliphatic polycarbonate and is the first approach which has not previously been attempted.

The method is advantageous from an economic viewpoint because the weight average molecular weight of the polymer can reach 80,000 or more in a short reaction time (7 hours).

Generally, the removal of a catalyst from a polymer after a condensation reaction is not easy, produces a large amount of wastewater, and incurs a considerable additional cost. Therefore, it is recommended to use the polymer without removal of the catalyst. In the polycarbonate prepared in steps 1 and 2, a metal or onium cation and a terminal alkoxy anion are dispersed. The use of the polymer containing the highly reactive alkoxy anion leads to poor thermal stability of a resin, causing problems in terms of processability and durability (Comparative Example 4). To achieve improved thermal stability, the method of the present invention further includes neutralizing the alkoxy anion (step 3). In step 3, the base catalyst is neutralized by the addition of an ammonium salt, an acid or an organic compound capable of reacting with the alkoxy anion to produce an anion having a pKa not greater than 3. The ammonium salt, the acid, and the organic compound may be selected from primary to tertiary ammonium salts having a pKa not greater than 3, acids in which a proton is bonded to an anion having a pKa not greater than 3, and organic compounds in which an alkyl, acyl or sulfonyl cation is bonded to an anion having a pKa not greater than 3, respectively. The resin obtained after the neutralization has a state in which a salt consisting of a metal or onium cation and an anion having a pKa not greater than 3 is dispersed in the final condensation product. Low reactivity of the anion having a pKa not greater than 3 ensures good thermal stability of the final resin (Example 13).

Resins in which an anion having a pKa exceeding 3 is dispersed, for example, a resin in which an alkoxy anion is dispersed after steps 1 and 2 and before neutralization and a resin in which a carboxylate anion is dispersed by neutralization with a carboxylic acid, are easily decomposed at high temperature due to their poor thermal stability, which can be confirmed in Comparative Examples 4 and 5. In contrast, a resin in which an anion having a pKa not greater than 3 is dispersed after neutralization has markedly improved thermal stability, which can be confirmed in Example 13.

Three reactions are possible that can form anions having a pKa not greater than 3 with alkoxy anions. The alkoxy anion can be converted to an anion having a pKa not greater than 3 by reaction with a primary, secondary or tertiary ammonium salt of an anion having a pKa not greater than 3. At this time, the alkoxy anion is converted to the corresponding alcohol and forms an amine as a by-product. Alternatively, the alkoxy anion may be converted to an anion having a pKa not greater than 3 by an acid-base reaction with an acid in which a proton is bonded to an anion having a pKa not greater than 3. At this time, the alkoxy anion is converted to the corresponding alcohol. Alternatively, the alkoxy anion may be converted to an anion having a pKa not greater than 3 by nucleophilic substitution with an organic compound in which an alkyl, acyl or sulfonyl cation is bonded to an anion having a pKa not greater than 3. At this time, the alkoxy anion is converted to an ether, ester or sulfonester group.

Specifically, the primary, secondary or tertiary ammonium salt of an anion having a pKa not greater than 3, the acid in which a proton is bonded to an anion having a pKa not greater than 3 or the organic compound in which an alkyl, acyl or sulfonyl cation is bonded to an anion having a pKa not greater than 3 may be selected from the group consisting of melamine phosphates, acyl halides, alkylsulfonyl halides, arylsulfonyl halides, phosphoric acid, alkylphosphoric acids, arylphosphoric acids, dialkylphosphoric acids, diarylphosphoric acids, trialkylphosphates, alkylphosphonic acids, arylphosphonic acids, dialkylphosphonic acids, diarylphosphonic acids, and mixtures thereof.

The base catalyst is preferably added in an amount ranging from 0.01 mol % to 0.5 mol %, based on the moles of the HO-A-OH. Within this range, a high molecular weight of the polymer can be obtained and the amount of the salt dispersed in the final resin does not significantly affect the physical properties of the resin.

When the base catalyst consists of a lithium, sodium or potassium cation and an alkoxy anion is used, the high molecular weight polymer is obtained in high yield. These metal bases are preferably available at reasonable prices (see Examples 1 to 10 and 12 in Table 1).

The HO-A-OH is selected from the group consisting of the compounds of Formulae 2a to 2h:

ortho-, meta-, or para-

These compounds are suitable in terms of availability because they are currently produced on a large scale.

Particularly, the use of the diol compounds of Formulae 2a to 2d as monomers enables the preparation of polymers with very high weight average molecular weights of 80,000 to 250,000.

Particularly, poly(butylene carbonate) prepared using the 1,4-butanediol is a crystalline polymer having a $T_m$ of 62° C. Various grades of poly(butylene carbonate) are possible by diversifying the $T_m$, degree of crystallization, and rate of crystallization of the polymer. This helps market exploitation of the polymer. In this aspect, useful is an aliphatic poly(alkylene carbonate) copolymer prepared from a mixture of 1,4-butanediol and one diol selected from the group consisting of the compounds of Formulae 2b to 2h. Particularly, when excess 1,4-butanediol and a small amount of one diol selected from the group consisting of the compounds of Formulae 2b to 2h are used, for example, in a molar ratio of 100:1-10, an economically desirable aliphatic poly(alkylene carbonate) copolymer can be prepared.

Effects of the Invention

Various embodiments of the present invention provide a new method for preparing an aliphatic polycarbonate having a weight average molecular weight of 80,000 to 250,000 by condensation of a dimethyl carbonate and an aliphatic diol using a base catalyst consisting of a metal or onium cation. In the polymer prepared by the method, a salt consisting of a terminal alkoxy anion is dispersed. When the polymer is directly used, the thermal stability of a resin deteriorates. In contrast, the method of the present invention includes neutralizing the alkoxy anion to ensure good thermal stability of the resin. In the high molecular weight aliphatic polycarbonate, a salt consisting of a metal or onium cation and an anion having a pKa not greater than 3 is dispersed.

Aliphatic polycarbonates are biodegradable and dimethyl carbonate used for the preparation of aliphatic polycarbonates can be produced using carbon dioxide as a raw material. Accordingly, such aliphatic polycarbonates are considered eco-friendly. Some crystalline aliphatic polycarbonates are very attractive in achieving desired physical properties. Until now, however, many problems have been encountered in the preparation of high molecular weight aliphatic polycarbonates. Under such circumstances, low molecular weight aliphatic polycarbonate-diols are used for polyurethane production. The present invention paves the way for the preparation of eco-friendly high molecular weight aliphatic polycarbonates that can be commercialized through their various application developments.

MODE FOR CARRYING OUT THE INVENTION

The effects of the present invention will be explained in detail with reference to the following examples, including comparative examples. However, these examples are provided for illustrative purposes only and are not intended to limit the scope of the invention. Sodium was reacted with and dissolved in 1,4-butanediol, and then phthaloyl chloride was added thereto. The phthaloyl chloride was used in an amount of 0.25 equivalents per equivalent of the sodium. After stirring at 80° C. overnight, the mixture was distilled under a vacuum of 0.15 mmHg at 20° C. to obtain anhydrous 1,4-butanediol.

Examples 1-12

Condensation Reaction of 1,4-Butanediol and Dimethyl Carbonate

Step 1: Each of the bases shown in Table 1 was added to anhydrous 1,4-butanediol (10.0 g, 111 mmol) in a 3-neck flask to form HO(CH$_2$)$_4$O$^-$M$^+$, and then dimethyl carbonate (DMC) (15.7 g, 174 mmol) was added thereto. The amounts of the bases used are shown in Table 1. A mechanical stirrer was connected to one neck of the flask, a manifold attached with a vacuum line and a nitrogen line was connected to another neck of the flask, and a distillation unit was connected to the remaining neck of the flask. After the reaction flask was immersed in a thermostatic bath at 120° C., the reaction was carried out for 1 h while distilling off formed methanol and a portion of the DMC at ambient pressure. A slight amount of the reaction mixture was sampled. After removal of methanol and unreacted DMC from the sample at room temperature, the molar ratio between —OH and —OCH$_3$ functional groups was determined by $^1$H NMR analysis.

Step 2: The reaction was continued for a total of 3.5 h while removing volatiles at an elevated temperature of 190° C. and a reduced pressure of 570 mmHg for 0.5 h, 380 mmHg for 1 h, and 190 mmHg for 2 h. Thereafter, the reaction was continued at 190° C. for additional 2 h while removing volatiles under a high vacuum of 0.3 mmHg, which was maintained using a vacuum pump. THF was not formed at 190° C. but was observed at 200° C. During the reaction, portions of the formed oligomer and cyclic compounds were condensed as solids at the top end of the reactor or on the wall surface of the distillation unit. In the final stage of the reaction, the solid compounds deposited at the top end of the reactor were heated and vaporized using a heat gun and they were condensed on the wall surface of the distillation unit.

Step 3: After cooling to 100° C., a solution of phthaloyl chloride in 1 mL THF was added to the flask. The phthaloyl chloride was used in an amount corresponding to half the equivalents of the base. For neutralization, the resulting mixture was stirred at ambient pressure and 160° C. for 2 h. The polymer compound formed in the flask was dissolved in methylene chloride and transferred to a one-neck flask. After removal of the methylene chloride under reduced pressure, the product was dried in an oven at 80° C. for 1 h. The yield of the product was measured. $^1$H NMR analysis revealed two strong signals with a 1:1 intensity ratio at 4.15 ppm and 1.77 ppm. Signals corresponding to the terminal —CH$_2$OH and —OH groups were not almost observed. The results of polymerization are shown in Table 1.

Comparative Example 1

Condensation Reaction of Crude 1,4-Butanediol and Dimethyl Carbonate

The procedure of Example 4 was repeated except that crude 1,4-butanediol was used in step 1. $^1$H NMR analysis revealed that the integrated intensities of the signals corresponding to CH$_2$OC(O), OCH$_3$, and CH$_2$OH were 2.35, 1.45, and 2.00, respectively, indicating that the [OCH$_3$]/[OH] ratio was 0.46 and did not reach 1 and the conversion of the alcohol groups to the carbonate groups was as low as 54%. When anhydrous 1,4-butanediol was used, the [OCH$_3$]/[OH] ratio reached 1.10 and the conversion of the alcohol groups to the carbonate groups was as high as 79% (see the results of Example 4). When crude 1,4-butanediol was used, the [OCH$_3$]/[OH] ratio and the conversion of the alcohol groups to the carbonate groups were varied depending on the water content of the 1,4-butanediol. That is, when 1,4-butanediol was purchased and used as received, the [OCH$_3$]/[OH] ratio and the conversion were the same as those described above. Thereafter, the 1,4-butanediol absorbed water present in air during repeated use, resulting in a gradual increase in water content. As a result, the [OCH$_3$]/[OH] ratio and the conversion were decreased below those described above.

Comparative Example 2

Condensation Reaction of 1,4-Butanediol and Dimethyl Carbonate after Step 1, the Molar Ratio Between —OH and —OCH$_3$ Functional Groups was 1:>1.5

The procedure of Example 4 was repeated except that DMC was added in an amount of 25.0 g (278 mmol). As can be seen from the results in Table 1, when the [OCH$_3$]/[OH] ratio after step 1 was as high as 5.70, the weight average molecular weight of the polymer obtained after step 2 was as low as 61,000. The polymer was characterized by $^1$H NMR analysis. Assuming that the integrated intensity of the signal corresponding to the —OC(O)OCH$_2$— groups in the polymer chain was defined as 100, the intensity of the signal corresponding to the terminal —OCH$_3$ groups observed at 3.79 ppm was 1.35 and no signal corresponding to the terminal —CH$_2$OH groups was observed. In another experiment, the reaction was continued under a vacuum as high as possible at 190° C. for additional 1 h. As a result, the integrated intensity of the signal corresponding to the terminal —OCH$_3$ groups was slightly reduced from 1.35 to 0.93. Thereafter, the reaction was continued for additional 1 h. The integrated intensity was maintained substantially constant (0.91), suggesting that there was a limitation in increasing the molecular weight of the polymer.

Comparative Example 3

Condensation Reaction of 1,4-Butanediol and Dimethyl Carbonate (after Step 1, the Molar Ratio Between —OH and —OCH$_3$ Functional Groups was 1:≤0.9

The procedure of Example 4 was repeated except that DMC was added in an amount of 10.0 g (111 mmol). The obtained polymer was characterized by $^1$H NMR analysis. Assuming that the integrated intensity of the signal corresponding to the —OC(O)OCH$_2$— groups in the polymer chain was defined as 100, no signal corresponding to the terminal —OCH$_3$ groups was observed and the intensity of the signal corresponding to the terminal —CH$_2$OH groups observed at 3.66 ppm was 7.32. The polymer was found to have a low molecular weight, indicating its low viscosity. The reaction was continued under high vacuum at 190° C. for additional 2, 4, 6, and 8 h. At each time point, a sample was taken from the reaction mixture. The reaction was traced by $^1$H NMR or GPC. The integrated intensities of the signals corresponding to the terminal —CH$_2$OH groups were observed to be 2.10, 1.46, 1.21, and 1.11 at the respective time points. At the time points of 4, 6, and 8 h, the polymer was observed to have weight average molecular weights of 32,000 ($M_w/M_n$=1.61, bimodal), 42,000 ($M_w/M_n$=1.54), and 53,000 ($M_w/M_n$=1.64), respectively, as measured by GPC. These results suggest that there was a limitation in increasing the molecular weight of the polymer.

TABLE 1

<Results of condensation reactions between 1,4-butanediol and dimethyl carbonate>

| | Base/amount (mol % relative to BD) | [OCH$_3$]/[OH]$^a$ | Yield$^b$ (%) | $M_w^c$ × $10^{-3}$ | $M_w/M_n^c$ |
|---|---|---|---|---|---|
| Example 1 | NaH/0.02 | 1.15 | 85 | 107 | 1.57 |
| Example 2 | NaH/0.05 | 1.09 | 90 | 124 | 1.65 |
| Example 3 | NaH/0.10 | 1.09 | 93 | 135 | 1.66 |
| Example 4 | NaH/0.20 | 1.10 | 90 | 162 | 1.65 |
| Example 5$^d$ | NaH/0.20 | 1.10 | 86 | 248 | 1.65 |
| Example 6 | NaH/0.50 | 1.10 | 86 | 145 | 1.60 |
| Example 7 | NaH/1.0 | 1.08 | 87 | 87 | 1.65 |
| Example 8 | NaOH/0.20 | 1.24 | 91 | 91 | 1.72 |
| Example 9 | nBuLi/0.20 | 1.08 | 88 | 139 | 1.71 |
| Example 10 | KH/0.20 | 1.14 | 87 | 133 | 1.74 |
| Example 11 | [Bu$_4$N]$^+$OH$^-$/0.20 | 1.01 | 90 | 128 | 1.62 |
| Example 12 | Isobutyl magnesium bromide/0.20 | 1.02 | 66$^e$ | 53 | 1.60 |
| Comparative Example 1 | NaH/0.20 | 0.46 | | | |
| Comparative Example 2 | NaH/0.20 | 5.70 | 89 | 61 | 1.64 |
| Comparative Example 3 | NaH/0.20 | 0.48 | 37 | 31 | 1.62 |

$^a$Molar ratio between —OCH$_3$/—OH functional groups after step 1, which was measured by $^1$H NMR analysis.
$^b$Value calculated from the mass of the obtained polymer relative to that of 1,4-butanediol added.
$^c$Value measured on the basis of polystyrene standard in THF at 40° C. by GPC.
$^d$Results obtained when the procedure of Example 4 was repeated except that the reaction was carried out at 190° C. for 8 h while removing volatiles under a high vacuum of 0.3 mmHg, which was maintained using a vacuum pump.
$^e$Formation of a large amount of THF.

Example 13

Confirmation of Thermal Stability of the Resin Obtained by Neutralization Reaction in Step 3

Figure 1:
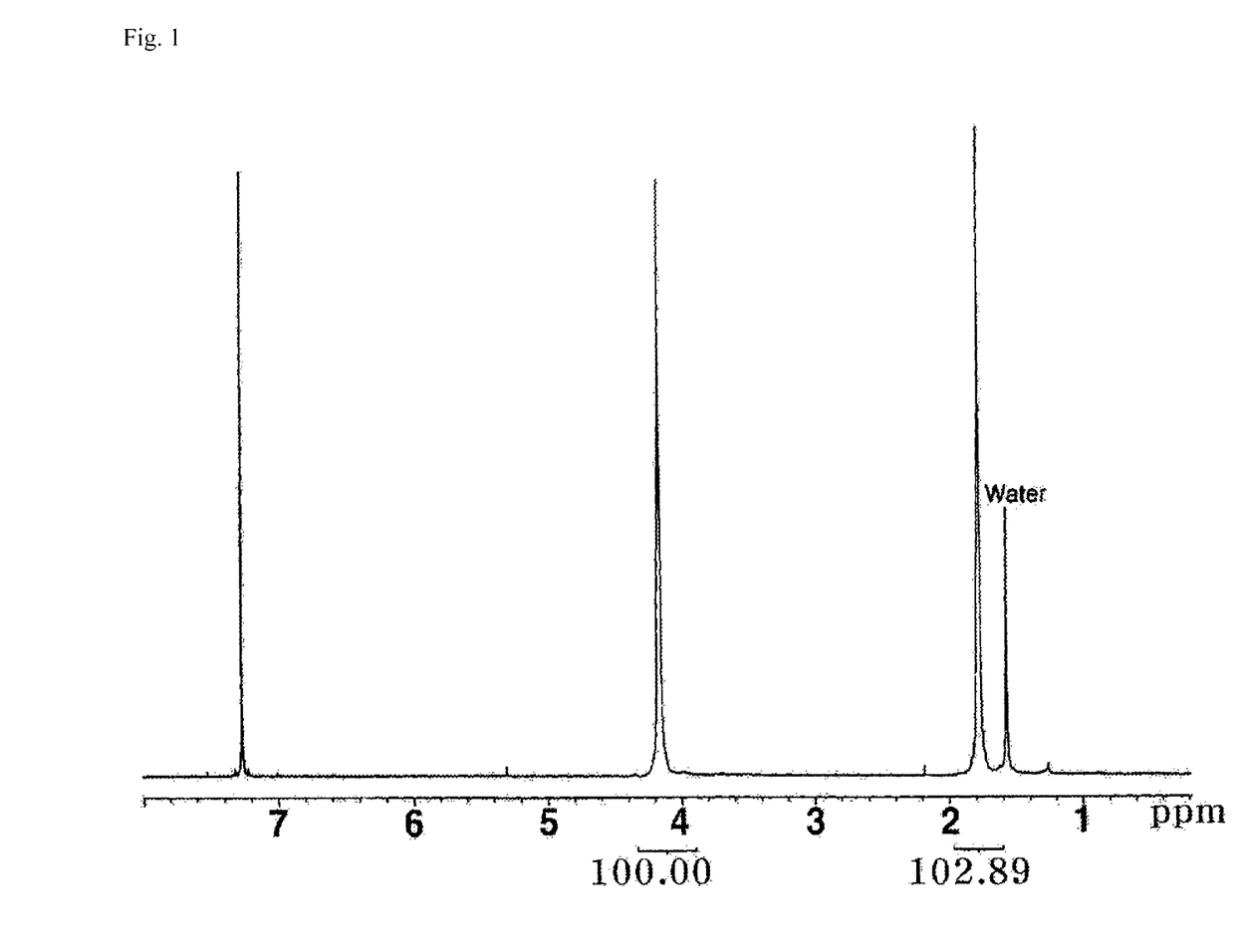
FIG. 1 is a $^1$H NMR spectrum of a copolymer having a weight average molecular weight of 162,000, which was prepared by condensation of 1,4-butanediol and dimethyl carbonate (Example 4).
Figure 2:
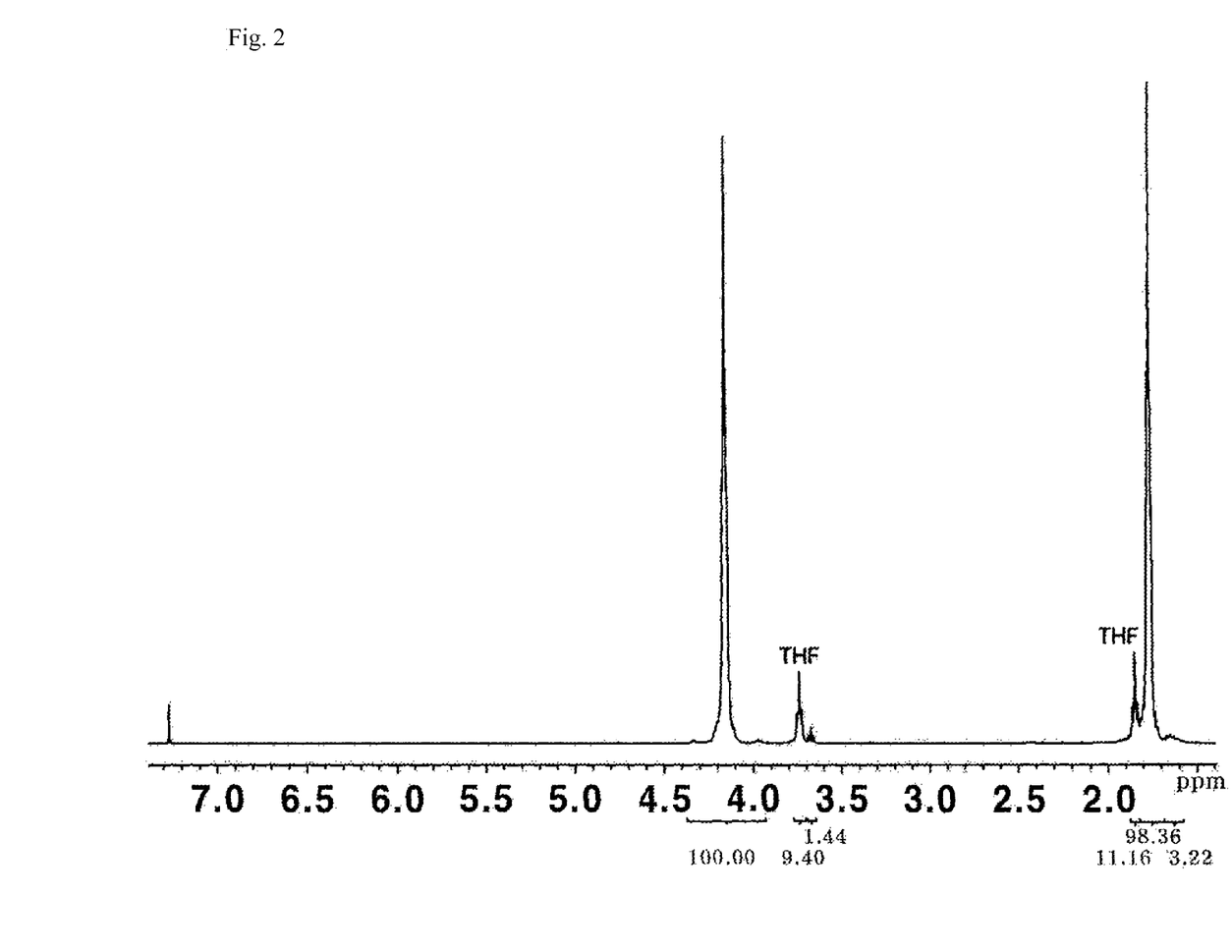
FIG. 2 is a $^1$H NMR spectrum of a resin having undergone no neutralization in step 3 (Comparative Example 4). For the spectrum measurement, the resin was immersed in a thermostatic bath at 200° C. and dissolved in CDCl$_3$. The spectrum reveals the formation of THF.

The resin obtained by neutralization with phthaloyl chloride (step 3) in Example 4 was placed in an NMR cell, immersed in a thermostatic bath at 200° C. under a nitrogen atmosphere for 2 h, and dissolved in CDCl$_3$ for NMR measurement. There was no change in the $^1$H NMR spectrum (FIG. 2). The procedure of Example 4 was repeated except that each of sebacoyl chloride, dibutyl phosphoric acid, phenyl phosphinic acid, and melamine phosphate salt was added instead of phthaloyl chloride in step 3. The resin obtained by neutralization was placed in an NMR cell, immersed in a thermostatic bath at 200° C. under a nitrogen atmosphere for 2 h, and dissolved in CDCl$_3$ for NMR measurement. Also in this case, no change was observed in the $^1$H NMR spectrum.

Comparative Example 4

Confirmation of Poor Thermal Stability of the Resin Having Undergone No Neutralization The procedure of Example 4 was repeated except that the neutralization was not performed in step 3. The resin having undergone no neutralization was placed in an NMR cell, immersed in a thermostatic bath at 200° C. under a nitrogen atmosphere for 2 h, and dissolved in CDCl$_3$ for NMR measurement. The $^1$H NMR spectrum revealed the formation of a large amount of THF (FIG. 2).

Comparative Example 5

Confirmation of Poor Thermal Stability of the Resin Obtained by Neutralization with Heptanoic Acid (pKa ~4.5)

The procedure of Example 4 was repeated except that heptanoic acid was added instead of phthaloyl chloride in step 3. The resin obtained by neutralization with the heptanoic acid was placed in an NMR cell, immersed in a thermostatic bath at 200° C. under a nitrogen atmosphere for 2 h, and dissolved in CDCl$_3$ for NMR measurement. The $^1$H NMR spectrum revealed the formation of a large amount of THF.

Examples 14-34

Condensation Reactions of Diol Mixture Consisting of 1,4-Butanediol (Formula 2a) and One Diol Selected from the Compounds of Formulae 2d-2h and Dimethyl Carbonate Step 1: 1,4-Butanediol and one of the diol compounds of Formulae 2d-2h were placed in a three-neck flask. The compounds were used in the corresponding molar ratio shown in Table 2 such that the total amount was 110 mmol. To the flask, NaH (5.3 mg, 0.2 mol %) was added to form sodium alkoxides and 15.0 g (167 mmol, Examples 14-17 and 23-26) or 16.0 g (178 mmol, Examples 18-22 and 27-34) of dimethyl carbonate (DMC) was added thereto. A mechanical stirrer was connected to one neck of the flask, a manifold attached with a vacuum line and a nitrogen line was connected to another neck of the flask, and a distillation unit was connected to the remaining neck of the flask. After the reaction flask was immersed in a thermostatic bath at 120° C., the reaction was carried out for 1 h while distilling off formed methanol and a portion of the DMC at ambient pressure. A slight amount of the reaction mixture was sampled. After removal of methanol and unreacted DMC from the sample at room temperature, the molar ratio between —OH and —OCH$_3$ functional groups was determined by $^1$H NMR analysis.

Step 2: The reaction was continued for 2 h while removing volatiles at an elevated temperature of 180° C. and a reduced pressure of 380 mmHg. Thereafter, the reaction was continued at 180° C. for additional 2 h and at 190° C. for additional 2 h while removing volatiles under a high vacuum of 0.3 mmHg, which was maintained using a vacuum pump. THF was not formed at 190° C. but was observed at 200° C.

Step 3: The procedure of Examples 1-12 was repeated. The results of condensation are shown in Table 2.

TABLE 2

<Results of condensation reactions between diol mixture consisting of 1,4-butanediol and one diol selected from the compounds of Formulae 2d-2h and dimethyl carbonate>

|  | Additional diol | BD:ester | $[OCH_3]/[OH]^a$ | Yield$^b$ (%) | $M_w^c \times 10^{-3}$ | $M_w/M_n^c$ | $T_m^d$ (°C.) | $T_g^d$ (°C.) | $\Delta H$ $(J/g)^d$ |
|---|---|---|---|---|---|---|---|---|---|
| Example 14 | Formula 2d | 99:1.0 | 1.16 | 81 | 115 | 1.61 | 60 | −32 | 32 |
| Example 15 | Formula 2d | 98:2.0 | 0.94 | 71 | 170 | 1.58 | 54 | −30 | 28 |
| Example 16 | Formula 2d | 95:5.0 | 1.09 | 73 | 133 | 1.66 |  | −28 |  |
| Example 17 | Formula 2d | 90:10 | 1.08 | 76 | 115 | 1.59 |  | −22 |  |
| Example 18 | Formula 2e | 99:1.0 | 1.28 | 84 | 162 | 1.54 | 58 | −32 | 33 |
| Example 19 | Formula 2e | 98:2.0 | 1.27 | 80 | 156 | 1.61 | 57 | −31 | 31 |
| Example 20 | Formula 2e | 95:5.0 | 1.15 | 82 | 158 | 1.94 | 54 | −29 | 15 |
| Example 21 | Formula 2e | 90:10 | 1.13 | 84 | 93 | 1.96 |  | −26 |  |
| Example 22$^e$ | Formula 2e | 98:2.0 | 1.16 | 84 | 230 | 1.83 | 62 | −32 | 29 |
| Example 23 | Formula 2f | 99:1.0 | 1.02 | 72 | 125 | 1.68 | 56 | −29 | 31 |
| Example 24 | Formula 2f | 98:2.0 | 1.03 | 77 | 125 | 1.67 | 52 | −28 | 19 |
| Example 25 | Formula 2f | 95:5.0 | 1.28 | 76 | 120 | 1.72 |  | −19 |  |
| Example 26 | Formula 2f | 90:10 | 1.24 | 79 | 104 | 1.67 |  | −4 |  |
| Example 27 | Formula 2g | 99:1.0 | 1.17 | 86 | 115 | 1.60 | 57 | −30 | 33 |
| Example 28 | Formula 2g | 98:2.0 | 1.19 | 83 | 131 | 1.58 | 57 | −28 | 31 |
| Example 29 | Formula 2g | 95:5.0 | 1.25 | 83 | 123 | 1.53 |  | −25 |  |
| Example 30 | Formula 2g | 90:10 | 1.03 | 79 | 88 | 1.49 |  | −19 |  |
| Example 31 | Formula 2h | 99:1.0 | 1.23 | 84 | 134 | 1.63 | 58 | −32 | 33 |
| Example 32 | Formula 2h | 98:2.0 | 1.20 | 80 | 113 | 1.60 | 51 | −29 | 27 |
| Example 33 | Formula 2h | 95:5.0 | 1.32 | 84 | 210 | 1.63 | 46 | −25 | 1 |
| Example 34 | Formula 2h | 90:10 | 1.37 | 83 | 163 | 1.68 |  | −14 |  |

$^a$Molar ratio between —OCH$_3$/—OH functional groups after step 1, which was measured by $^1$H NMR analysis.
$^b$Value calculated from the actually obtained mass of the polymer relative to the maximum mass of the polymer obtainable from 1,4-butanediol and additional diol added.
$^c$Value measured on the basis of polystyrene standard in THF at 40° C. by GPC.
$^d$First scan data measured by DSC. The blanks indicate that the polymers were non-crystalline.
$^e$Reaction was carried out under high vacuum for additional 6 h in step 2.

Example 35

Condensation Reaction of Formula 2c and Dimethyl Carbonate

Step 1: The procedure of Example 4 was repeated except that 1,6-hexanediol (10.0 g, 85 mmol), NaH (4.10 mg, 0.17 mmol), and DMC (12.0 g, 133 mmol) were used.

Step 2: The reaction was continued for 1 h while removing volatiles at an elevated temperature of 180° C. and a reduced pressure of 380 mmHg. Thereafter, the reaction was continued at 180° C. for additional 2 h and at 200° C. for additional 2 h (a total of 4 h) while removing volatiles under a high vacuum of 0.3 mmHg, which was maintained using a vacuum pump.

Step 3: The procedure of Example 4 was repeated. The results of condensation are summarized in Table 3.

Example 36

Condensation Reaction of Formula 2d and Dimethyl Carbonate

Step 1: The procedure of Example 4 was repeated except that 1,4-cyclohexanedimethanol (10.0 g, 69 mmol), NaH (3.30 mg, 0.14 mmol), and DMC (10.3 g, 114 mmol) were used.

Step 2: The reaction was continued for 1 h while removing volatiles at an elevated temperature of 180° C. and a reduced pressure of 380 mmHg. Thereafter, the reaction was continued at 210° C. for additional 1 h and at 240° C. for additional 3 h (a total of 4 h) while removing volatiles under a high vacuum of 0.3 mmHg, which was maintained using a vacuum pump.

Step 3: The procedure of Example 4 was repeated. The results of condensation are summarized in Table 3.

Example 37

Condensation Reaction of Formula 2h and Dimethyl Carbonate

Step 1: The procedure of Example 4 was repeated except that tricyclodecanedimethanol (10.0 g, 51 mmol), NaH (2.40 mg, 0.10 mmol), and DMC (8.26 g, 92 mmol) were used.

Step 2: The reaction was continued for 1 h while removing volatiles at an elevated temperature of 180° C. and a reduced pressure of 380 mmHg. Thereafter, the reaction was continued at 210° C. for additional 1 h and at 240° C. for additional 3 h (a total of 4 h) while removing volatiles under a high vacuum of 0.3 mmHg, which was maintained using a vacuum pump.

Step 3: The procedure of Example 4 was repeated. The results of condensation are summarized in Table 3.

TABLE 3

<Results of condensation reaction between each of Formula 2c, Formula 2d, and Formula 2h and dimethyl carbonate>

|  | Diol | $[OCH_3]/[OH]^a$ | Yield $(\%)^b$ | $M_w^c \times 10^{-3}$ | $M_w/M_n^c$ |
|---|---|---|---|---|---|
| Example 35 | Formula 2c | 1.28 | 95 | 201 | 1.87 |
| Example 36 | Formula 2d | 1.31 | 96 | 174 | 1.90 |
| Example 37 | Formula 2h | 1.29 | 98 | 45 | 1.81 |

$^a$Molar ratio between —OCH$_3$/—OH functional groups after step 1, which was measured by $^1$H NMR analysis.
$^b$Value calculated from the actually obtained mass of the polymer relative to the maximum mass of the polymer obtainable from diol added.
$^c$Value measured on the basis of polystyrene standard in THF at 40° C. by GPC.

The invention claimed is:

1. An aliphatic polycarbonate in which a salt consisting of a metal or onium cation and an anion having a pKa not greater than 3 is dispersed, the aliphatic polycarbonate comprising repeating units of Formula 1:

[Formula 1]

wherein A is a substituted or unsubstituted C3-C60 alkylene, or a substituted or unsubstituted C3-C60 heteroalkylene and the O-A-O units in one polymer chain are identical to or different from each other.

2. The aliphatic polycarbonate according to claim 1, wherein the salt is dispersed in an amount of 0.01 to 0.5 mol %, based on the moles of the repeating units.

3. The aliphatic polycarbonate according to claim 1, wherein the metal or onium cation is selected from the group consisting of lithium, sodium, and potassium cations and the anion having a pKa not greater than 3 is selected from the group consisting of halide, phosphate, alkyl phosphate, aryl phosphate, dialkyl phosphate, diaryl phosphate, alkyl phosphonate, aryl phosphonate, dialkyl phosphinate, and diaryl phosphinate anions.

4. The aliphatic polycarbonate according to claim 1, wherein the HO-A-OH as a raw material for the aliphatic polycarbonate of Formula 1 is selected from the group consisting of the compounds of Formulae 2a to 2h:

[Formula 2a]
[Formula 2b]
[Formula 2c]
[Formula 2d]
[Formula 2e]
[Formula 2f]
[Formula 2g]
ortho-, meta-, or para-
[Formula 2h]

5. The aliphatic polycarbonate according to claim 1, wherein the HO-A-OH as an aliphatic diol raw material for the copolymer of Formula 1 is selected from the group consisting of the compounds of Formulae 2a to 2d and has a weight average molecular weight of 80,000 to 250,000.

6. The aliphatic polycarbonate according to claim 4, wherein the HO-A-OH as an aliphatic diol raw material for the copolymer of Formula 1 is a mixture of the compound of Formula 2a and one diol compound selected from the group consisting of the compounds of Formulae 2b to 2h and has a weight average molecular weight of 80,000 to 250,000.

7. A method for preparing an aliphatic polycarbonate, comprising:
    condensing a mixture of HO-A-OH and dimethyl carbonate in the presence of a base catalyst while removing an alcohol by-product by heating to or above the boiling point of the dimethyl carbonate (step 1);
    reacting the reaction product of step 1 while distilling off volatiles by distillation under reduced pressure at high temperature to maximize the conversion rate of the reaction (step 2); and
    neutralizing the base catalyst in the condensation product formed in step 2 with a primary, secondary or tertiary ammonium salt of an anion having a pKa not greater than 3, an acid in which a proton is bonded to an anion having a pKa not greater than 3 or an organic compound in which an alkyl, acyl or sulfonyl cation is bonded to an anion having a pKa not greater than 3 (step 3),
    wherein the conversion rate is maximized by controlling the molar ratio of the alkoxy groups to the hydroxyl groups in the reaction product of step 1 to 1:0.9-1.5, and
    wherein A is a substituted or unsubstituted C3-C60 alkylene, or a substituted or unsubstituted C3-C60 heteroalkylene, the base catalyst is a salt consisting of a metal or onium cation and an alkoxy anion formed by deprotonation of the HO-A-OH, the final condensation product has repeating units having a structure represented by —[OC(O)O-A]-, the O-A-O units in one polymer chain are identical to or different from each other, and a salt consisting of a metal or onium cation and an anion having a pKa not greater than 3 is dispersed in the final condensation product.

8. The method according to claim 7, wherein the HO-A-OH is anhydrous.

9. The method according to claim 7, wherein the base catalyst is used in an amount of 0.01 to 0.5 mol %, based on the moles of the HO-A-OH.

10. The method according to claim 7, wherein the base catalyst consists of a lithium, sodium or potassium cation and an alkoxy anion formed by deprotonation of the HO-A-OH, and the ammonium salt, the acid or the organic compound is selected from the group consisting of melamine phosphates, acyl halides, alkylsulfonyl halides, arylsulfonyl halides, phosphoric acid, alkylphosphoric acids, arylphosphoric acids, dialkylphosphoric acids, diarylphosphoric acids, trialkylphosphates, alkylphosphonic acids, arylphosphonic acids, dialkylphosphonic acids, diarylphosphonic acids, and mixtures thereof.

11. The method according to claim 7, wherein the HO-A-OH is selected from the group consisting of the compounds of Formulae 2a to 2h:

[Formula 2a]
[Formula 2b]
[Formula 2c]

12. The method according to claim 7, wherein the HO-A-OH is selected from the group consisting of the compounds of Formulae 2a to 2d.

13. The method according to claim 7, wherein the HO-A-OH is a mixture of the compound of Formula 2a and one diol compound selected from the group consisting of the compounds of Formulae 2b to 2h in a molar ratio of 100:1-10.

14. A method for preparing an aliphatic polycarbonate, comprising:
condensing a mixture of HO-A-OH and dimethyl carbonate in the presence of a base catalyst while removing an alcohol by-product by heating to or above the boiling point of the dimethyl carbonate (step 1);
reacting the reaction product of step 1 while distilling off volatiles by distillation under reduced pressure at high temperature to maximize the conversion rate of the reaction (step 2); and
neutralizing the base catalyst in the condensation product formed in step 2 (step 3),
wherein the conversion rate is maximized by controlling the molar ratio of the alkoxy groups to the hydroxyl groups in the reaction product of step 1 to 1:0.9-1.5 such that the final polymer has a weight average molecular weight of at least 80,000, and
wherein A is a substituted or unsubstituted C3-C60 alkylene, or a substituted or unsubstituted C3-C60 heteroalkylene, the base catalyst is a salt consisting of a metal or onium cation and an alkoxy anion formed by deprotonation of the HO-A-OH, the final condensation product has repeating units having a structure represented by —[OC(O)O-A]-, the O-A-O units in one polymer chain are identical to or different from each other, and a salt is dispersed in the final condensation product.

* * * * *